United States Patent
Rakshit et al.

(10) Patent No.: US 10,919,439 B2
(45) Date of Patent: Feb. 16, 2021

(54) VIRTUAL VEHICLE PROTECTIVE FENCE

(71) Applicant: International Business Machines Corporation, Armonk, NY (US)

(72) Inventors: Sarbajit K. Rakshit, Kolkata (IN); John M. Ganci, Jr., Raleigh, NC (US); James E. Bostick, Cedar Park, TX (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/378,469

(22) Filed: Apr. 8, 2019

(65) Prior Publication Data

US 2020/0317116 A1    Oct. 8, 2020

(51) Int. Cl.
| | | |
|---|---|---|
| *B60Q 1/16* | (2006.01) | |
| *B60Q 1/50* | (2006.01) | |
| *B60Q 1/46* | (2006.01) | |
| *B60Q 1/26* | (2006.01) | |
| *G06K 9/00* | (2006.01) | |
| *G10L 17/00* | (2013.01) | |

(52) U.S. Cl.
CPC .......... *B60Q 1/26* (2013.01); *G06K 9/00288* (2013.01); *G06K 9/00832* (2013.01); *G10L 17/00* (2013.01)

(58) Field of Classification Search
CPC ....................................................... B60Q 1/26
See application file for complete search history.

(56) References Cited

U.S. PATENT DOCUMENTS

| | | | |
|---|---|---|---|
| 7,812,711 B2 | 10/2010 | Brown et al. | |
| 10,089,872 B1 | 10/2018 | Beaurepaire | |
| 2012/0194356 A1 | 8/2012 | Haines et al. | |
| 2014/0142805 A1* | 5/2014 | Frye | B60R 16/023 |
| | | | 701/36 |
| 2016/0171862 A1 | 6/2016 | Das et al. | |
| 2017/0240098 A1* | 8/2017 | Sweeney | B60Q 1/44 |
| 2018/0122205 A1* | 5/2018 | Mujeeb | H04W 4/021 |
| 2018/0253609 A1* | 9/2018 | Potter | G06K 9/00791 |
| 2019/0104285 A1* | 4/2019 | Medvec | H04N 9/3161 |
| 2019/0106050 A1* | 4/2019 | Kamhi | G06K 9/00805 |

FOREIGN PATENT DOCUMENTS

WO    2018206870 A1    11/2018

OTHER PUBLICATIONS

Faggella, D., "The Self-Driving Car Timeline—Predictions from the Top 11 Global Automakers", Last updated on Mar. 14, 2020, 23 pages <https://www.techemergence.com/self-driving-car-timeline-themselves-top-11-automakers/.
Wired Brand Lab, "Autonomous vehicles—Watson IoT helps pave an industry revolution", Nov. 1, 2017, 5 pages, <https://www.ibm.com/blogs/internet-of-things/iot-autonomous-vehicles/>.

(Continued)

*Primary Examiner* — Joseph H Feild
*Assistant Examiner* — Pameshanand Mahase
(74) *Attorney, Agent, or Firm* — Jamar K. Ray

(57) ABSTRACT

Example techniques are described for protecting passengers while entering or exiting a vehicle by determining a personalized protective zone immediately surrounding the vehicle. Information of the personalized protective zone and its borders may be communicated to nearby drivers and vehicles.

20 Claims, 5 Drawing Sheets

(56) References Cited

OTHER PUBLICATIONS

IBM, "Automotive Archives", printed Sep. 20, 2020, 7 pages, <https://www.ibm.com/blogs/internet-of-things/tag/automotive/>.

University of Michigan, "How even one automated, connected vehicle can improve safety and save energy in traffic", Science Daily, May 9, 2018, 5 pages, <https://www.sciencedaily.com/releases/2018/05/180509104925.htm>.

Vinnova, "Autonomous Driving Aware Traffic Control—Final Report", Jul. 2017, 60 pages, <https://www.drivesweden.net/sites/default/files/content/ad_aware_traffic_control_-_final_report_v11_0.pdf>.

* cited by examiner

VIRTUAL VEHICLE PROTECTIVE FENCE

BACKGROUND

Recent advances in accident-avoidance technology have resulted in a new fleet of vehicles manufactured with sets of semi-autonomous, and increasingly, fully autonomous safety features. Some examples of these features include hazard detection and automatic braking. These advanced safety technologies, while beneficial, may not always be sufficient to avoid sudden hazards.

SUMMARY

In some examples, the disclosure describes a system that includes a receiver configured to receive passenger data indicative of a passenger of a vehicle, and processing circuitry configured to determine a personal protective zone surrounding the exterior of a vehicle based at least in part on the passenger data and output information indicating the determined personal protective zone.

In some examples, the disclosure describes a method that includes receiving passenger data indicative of a passenger of a vehicle, determining a personal protective zone surrounding the exterior of a vehicle based at least in part on the passenger data, and outputting information indicating the determined personal protective zone.

In some examples, the disclosure describes a computer-readable storage medium storing instructions thereon that, when executed, cause one or more processors to receive passenger data indicative of a passenger of a vehicle, determine a personal protective zone surrounding the exterior of a vehicle based at least in part on the passenger data, and output information indicating the determined personal protective zone.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the drawings indicate like elements.

DETAILED DESCRIPTION

In general, this disclosure describes systems and methods for protecting passengers of a vehicle, particularly when entering or exiting the vehicle. One example of such a system includes a device configured to determine a personalized protective zone immediately surrounding the vehicle (e.g., exterior of the vehicle) and communicate that personalized protection zone to nearby drivers and autonomous vehicles so that they may avoid entering the zone.

Recent advances in accident-avoidance technology have resulted in a new fleet of vehicles manufactured with sets of semi-autonomous, and increasingly, fully autonomous safety features. Some examples of these features include hazard detection and automatic braking. These advanced safety technologies, while beneficial, may not always be 100% effective to avoid sudden obstacles. For example, in March 2018, an autonomous vehicle struck and killed a pedestrian in Tempe, Ariz., who had stepped in front of the vehicle outside of a crosswalk. Another frequently occurring example of a suddenly-appearing pedestrian is an occupant of another vehicle, such as the driver or a passenger, in the process of entering or exiting the other vehicle.

Due to the passenger's association with a semi-autonomous or autonomous vehicle an adequate safety system may be developed to warn nearby drivers and vehicles of the passenger's presence, so that they may avoid driving too closely to a potential collision. For example, the passenger's vehicle may determine a personalized protective zone for the passenger and communicate this information to nearby vehicles that then provide information about the protective zone to the driver to avoid the passenger or are configured to automatically ensure that the vehicle remains outside the personalized protective zone of the passenger.

Figure 1:
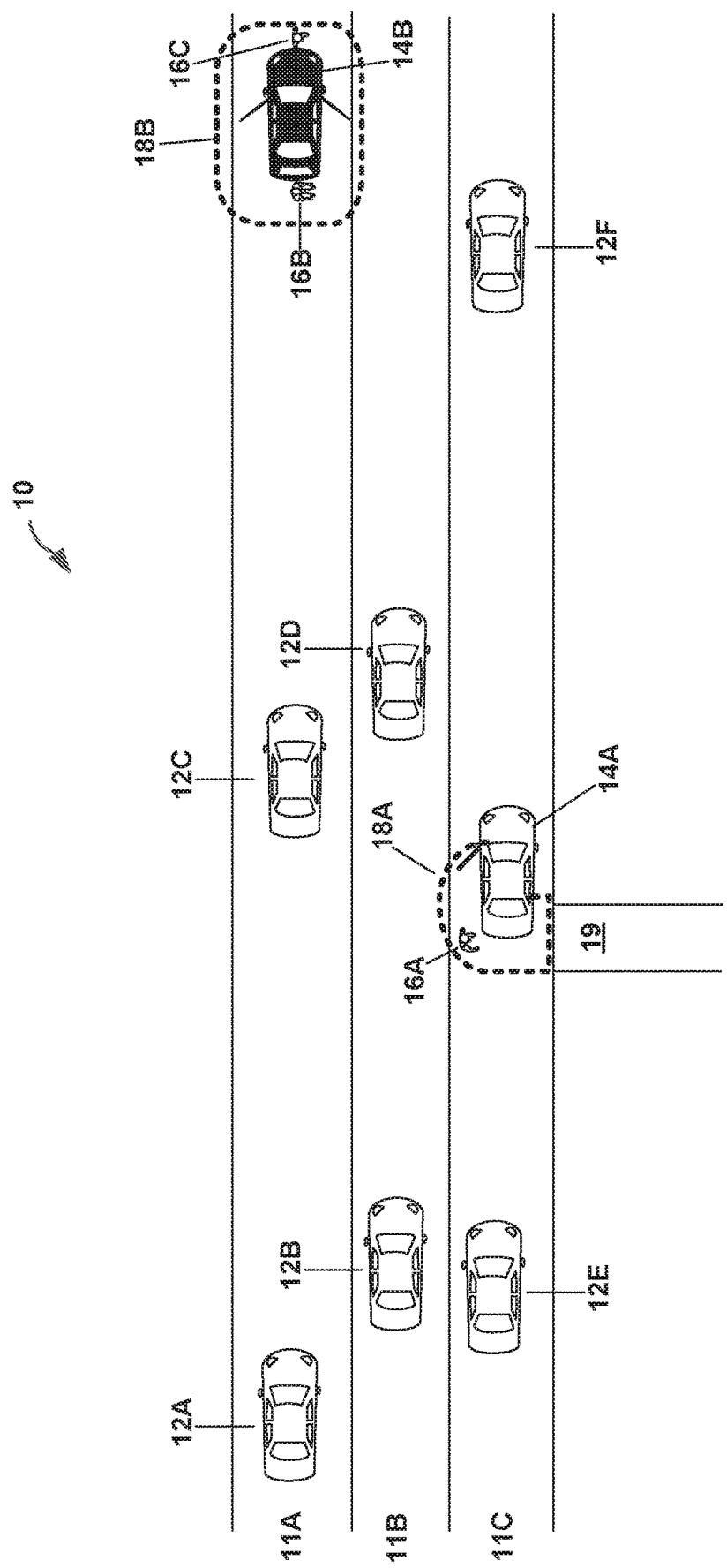
FIG. 1 is an overhead view depicting a virtual vehicle safety system, in accordance with some examples of this disclosure.

FIG. 1 is an overhead view depicting a virtual vehicle safety system 10, in accordance with some examples of this disclosure. In some examples, vehicle safety system 10 may include a centralized data processing hub, configured to communicate with and coordinate with any number of vehicles within a certain range of the system. For example, safety system 10 may be localized at a certain establishment or physical location, but may be configured to interact with corresponding safety components installed within vehicles travelling at or near that location.

The example scenario depicted in FIG. 1 includes multiple lanes of traffic 11A-11C in which a vehicle might temporarily stop for passengers to enter or exit the vehicle. One example in which this might occur is an airport, in which a vehicle (such as a taxi, ride-sharing vehicle, etc.) may stop in any lane of traffic to pick up or drop off a traveler. Another example location scenario is a stretch of ordinary road or highway, in which an emergency vehicle (such as a police officer, first responder, ambulance, or firefighter) may stop in any lane of traffic to address a traffic accident.

In the example scenario depicted in FIG. 1, three lanes of traffic 11A-11C include multiple moving vehicles 12A-12F (collectively, moving vehicles 12), as well as two stopped vehicles 14A and 14B. Both stopped vehicles 14A and 14B have one or more passengers 16A-16C who have either just exited their respective vehicle, or are about to enter it, and are at risk of being struck by one of moving vehicles 12.

In some examples, in accordance with this disclosure, each of stopped vehicles 14A and 14B include installed safety features configured to communicate within centralized virtual safety system 10. For example, each of stopped vehicles 14A and 14B may include an installed virtual vehicle safety system configured to generate a virtual "fence" 18A and 18B around the exterior of the respective vehicle, and communicate the dimensions of this "fence" to nearby vehicles, such as moving vehicles 12, so that moving vehicles 12 may avoid driving too closely to the fence. With the virtual fence 18 in place, the passenger 16 may safely travel within the personal protective zone that is created between the vehicle 14 and the fence 18.

In some examples, virtual safety system 10 may generate a virtual fence 18 and personal protective zone that is personalized according to the unique physical needs of the respective passenger 16. For example, vehicle 14A includes a single passenger 16A sitting in the driver's seat, as indicated by the open driver's side door. Accordingly, the virtual safety system installed within vehicle 14A may generate a virtual fence 18A that surrounds the driver's-side doors and the back of the vehicle, allowing passenger 16A to obtain items from the trunk of the car and access sidewalk 19 from the back of the vehicle. However, the virtual safety system 10 will not generate a virtual fence or personal protective zone around the passenger's-side doors or the front of the vehicle, as the system does not determine that these doors will need to be opened or the front-vehicle space entered. This may allow for conservation of available space, in that another vehicle may pull into and park in the space immediately in front of vehicle 14A, such as to pick up or drop off another passenger. In some examples, vehicle 14A includes seat sensors to indicate how many people are seated in vehicle 14A, and virtual safety system 10 may utilize the sensor information to determine the size and shape of virtual fence 18A.

In contrast, vehicle 14B includes two passengers 16B and 16C (as determined based on sensors in vehicle 14B), seated in opposite sides of the vehicle, as indicated by the open driver's-side and passenger's-side doors. Additionally, passenger 16B is depicted to be seated in a wheelchair. Based on this seating arrangement and the unique physical (in this case, medical) needs of passengers 16B and 16C, virtual safety system may generate a virtual fence 18B around the entire circumference of vehicle 14B, including an extra-wide personal protective zone to accommodate the more difficult maneuvering of the wheelchair of passenger 16B.

In some examples, passenger 16B (or possibly some other passenger) may have inputted information into a memory indicating that passenger 16B is in a wheelchair. Passenger 16B may also provide some input indicating that he or she is currently a passenger or there may be other ways in which to determine that passenger 16B is a passenger.

Virtual safety system 10 may store a look-up table that indicates what the size, shape, and duration of the personalized protective zone should be for various criteria. For instance, if there is a single passenger without a relevant medical condition, the memory may store an entry indicating the size and shape of the personalize protection zone. If there are multiple passengers and at least one has a relevant medical condition, the memory may store an entry indicating the size and shape of the personalized protection zone. Other examples of the entries are possible and contemplated in this disclosure.

In addition to determining a customized size and/or shape of virtual fence 18, safety system 10 may also determine a predicted duration of the fence. For example, safety system 10 may determine, based on weight-sensors within the trunk of vehicle 14A, that passenger 16A has a lot of luggage to unload before the vehicle may depart. Accordingly, safety system 10 may determine that virtual fence 18A will need to be enabled for a longer duration than a vehicle with no luggage. Safety system 10 may then broadcast this determined duration, so that any vehicles waiting for a spot to pull over and park may approach a spot with a shorter determined virtual fence duration, rather than waiting the longer time for vehicle 14A to depart.

Virtual safety system 10 may obtain personal information about the passengers from a number of sources, as described further in FIG. 3, below. However, in cases in which safety system 10 is unable to obtain any personal passenger information on which to determine the size, shape, or duration of virtual fence 18, the system may generate a default virtual fence 18 around vehicle 14 that is at least as wide as a fully-open door of the vehicle. In such cases wherein the passenger data is not available, the personal protective zone is a default protective zone different than the determined personal protective zone.

Figure 2:
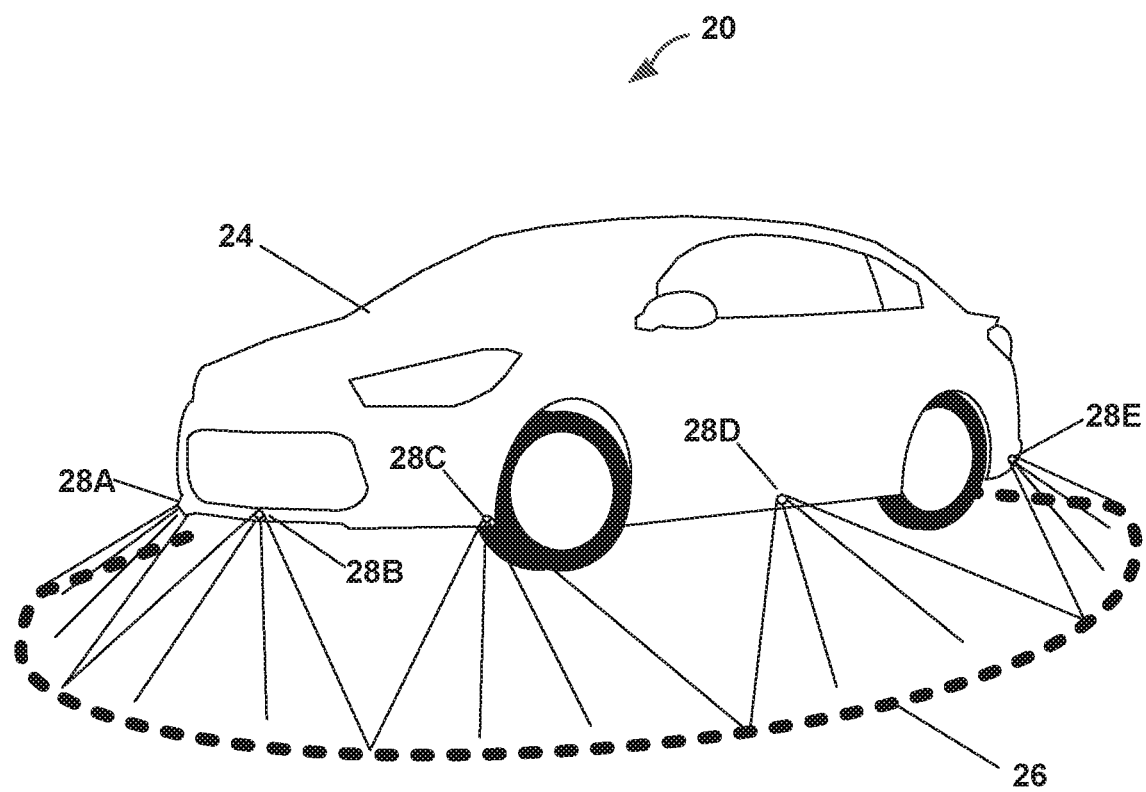
FIG. 2 is an oblique view of a vehicle having a virtual vehicle safety system, in accordance with some examples of this disclosure.

FIG. 2 is an oblique view of a vehicle having a virtual vehicle safety system 20, in accordance with some examples of this disclosure. Virtual safety system 20 may be installed within vehicle 24 and/or configured to communicate with a larger centralized safety system. Safety system 20 may be configured to generate, based on the unique personal needs of the passengers of vehicle 24, a virtual "fence" 26 around vehicle 24 to protect the passengers from nearby moving vehicles. Safety system 20 may wirelessly communicate the boundary of virtual fence 26 to nearby semi-autonomous and autonomous vehicles, so that they may more accurately predict the obstruction presented by the passengers entering or exiting vehicle 24.

However, manually driven vehicles may not be configured to wirelessly receive information indicating the boundary of virtual fence 26. In order to communicate the personal protective zone defined by virtual fence 26 to drivers of manually driven vehicles, safety system 20 may include one or more projectors 28A-28E (collectively, projectors 28) configured to project a visual representation of virtual fence 26 onto the surface of the road.

For example, vehicle 24 may have installed an array of projectors 26, such as pico-projectors, configured to illuminate a boundary line onto the road. The boundary line may be solid, dashed, or flashing. In some examples, the boundary line and personal protective zone may mimic a traffic light, changing color from green to yellow to red as vehicle 24 pulls to a stop and passengers either open the doors to exit or approach the vehicle to enter.

Figure 3:
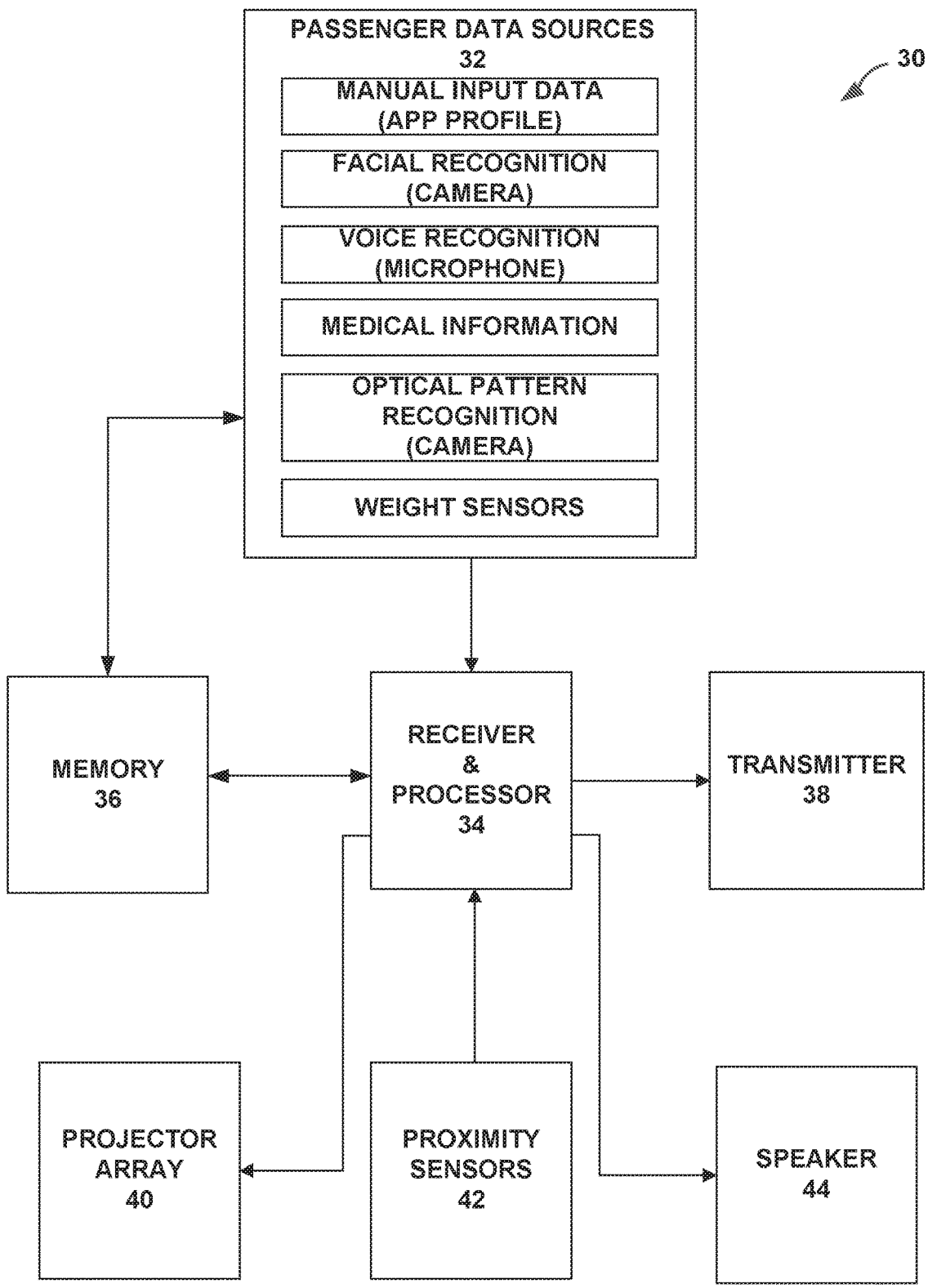
FIG. 3 is a block diagram depicting some example components of a virtual vehicle safety system, in accordance with some techniques of this disclosure.

FIG. 3 is a block diagram depicting some example components of a virtual vehicle safety system 30, in accordance with some techniques of this disclosure. Safety system 30 may include both components installed within a vehicle as well as components that are part of a larger centralized vehicle safety management system. Both sets of components may be in data communication with each other, for example, wirelessly.

Safety system 30 includes a number of components 32 configured to obtain data indicating the personal attributes or needs of one or more passengers of a vehicle, in order to predict or determine the amount of time and space the passengers may require in order to enter or exit the vehicle. For example, safety system 30 may include components configured to determine if the passenger has any unique physical or medical needs, or is travelling with a small child. In these examples, the system may include components configured to identify the passengers, such as cameras configured with facial recognition software, or microphones configured with voice recognition software. In another example, the passengers may identify themselves, by inputting personal information into a profile on a ride-sharing application used by the vehicle to pick-up and/or drop-off passengers. The vehicle may also include one or more weight sensors throughout the vehicle, such as under the seats, so as to determine a number, size, and/or age of passengers. Safety system 30 may also include cameras configured with advanced pattern recognition software, so as to recognize one or more articles of luggage or medical devices such as a wheelchair or crutches, any of which may indicate a mobility of a passenger.

Safety system 30 may include receiver and processor 34, configured to receive passenger data directly from data sources 32, or alternatively, to retrieve the data from memory 36. Once processor 34 has received passenger data, for example, indicating a number of passengers, a position of passengers within a vehicle, a physical mobility of the passengers, or any other data indicating unique vehicle boarding or exiting requirements of the passengers, processing circuitry may use this data to determine a unique personal protective zone around the vehicle, defined by a virtual border or fence. For example, processor 34 may submit the received passenger data as a query to a lookup table storing information indicating one or more parameters of a personal protective zones that correspond to certain passenger data inputs. Processor 34 may, for example, determine a size, a shape, and/or a duration of a virtual fence based at least in part on information received from the lookup table.

Once processor 34 has determined a size, a shape, and/or a duration of a virtual fence around the vehicle, based at least in part on unique passenger requirements, processor 34 may output information indicating the virtual fence to transmitter 38, in order to wirelessly transmit the description of the virtual fence to nearby vehicles configured to receive such information. Additionally or alternatively, processor 34 may output the indication of the virtual fence to projector array 40, which may be installed at or near the underside of the vehicle. Projector array 40 may project a visual representation, for example, with light, of the virtual fence onto the surrounding road surface, so that it may be recognized by both the passengers of the vehicle and drivers of nearby vehicles.

Safety system 30 may also include one or more proximity sensors, installed within the vehicle itself and/or installed around the location where the vehicle is stopped. Proximity sensors 42 may be configured to detect the presence of a person or other object outside of the vehicle, and communicate the person's location to processor 34. Processor 34 may then make two determinations—first, whether the person is within or outside of the personal protective zone defined by the virtual fence; and second, if the person is outside of the personal protective zone, whether the person's location corresponds to a safe location, such as a sidewalk, or an unsafe location, such as a lane of traffic. In the event that processor 34 determines both that the person is outside the virtual fence and is in an unsafe location, processor 34 may output an alert, such as an audible alert, to a speaker, so as to indicate to the person that their safety may be at risk.

Figure 4:
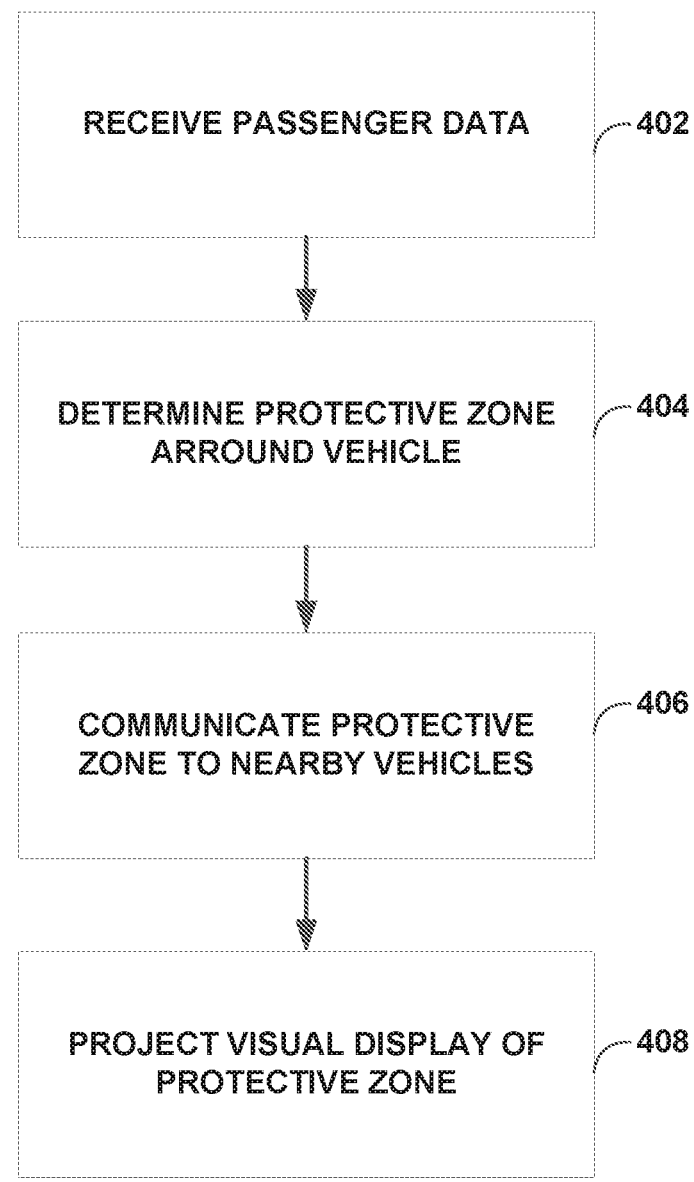
FIG. 4 is a flow diagram depicting a method of protecting passengers entering and/or exiting a vehicle, in accordance with some examples of this disclosure.

FIG. 4 is a flow diagram depicting a method of protecting passengers entering and/or exiting a vehicle, in accordance with some examples of this disclosure. A transportation safety system, including one or more computing devices (such as receivers, processors, and/or digital memory), that may be installed within an individual stopped vehicle and/or within a fixed, centralized location, receive data from one or more sources indicating one or more personal attributes of the passengers or intended passengers of the vehicle (402). This data may indicate, for example, the number of passengers, the ages of the passengers, any medical conditions of the passengers that may affect the passengers' ability to enter or exit the vehicle, or a size and/or weight of personal belongings of the passengers that may need to be loaded into or unloaded from the vehicle.

Based at least in part on the received passenger data, the computing device or processor may determine at least a size and a shape of a personal protective zone surrounding the vehicle, of sufficient dimensions to allow the passengers to enter and/or exit the vehicle while remaining within the protective zone (404). In the event that no passenger data can be received or determined, the computing device or processor may resort to a default size and shape for the protective zone, for example, a shape completely surrounding the exterior of the vehicle, and a width at least as wide as an open door of the vehicle.

Once the processor has determined an adequate personal protective zone for the number and position of passengers or intended passengers, the processor may communicate the boundary of the zone, such as via a wireless transmitter, so that the dimensions may be received by other moving vehicles in the vicinity that are configured to receive such data (406). Similar safety system installed within such vehicles may then use the data to guide the navigate the moving vehicles safely around the border of the personal protective zone, such that the moving vehicles have a significantly reduced risk of colliding with a passenger immediately outside the stopped vehicle, such as while suddenly opening a door of the stopped vehicle.

The processor may also output an indication of the boundary of the personal protective zone to one or more light projectors, such as pico-projectors installed on the exterior of the stopped vehicle, causing the projectors to project a visual representation of the determined personal protective zone onto the road or street surface (408). This projection may allow the passengers of the stopped vehicle, as well as drivers of vehicles not configured to wirelessly receive the indication of the border, to become aware of the personal protective zone, and take the necessary precautions to avoid a collision.

Figure 5:
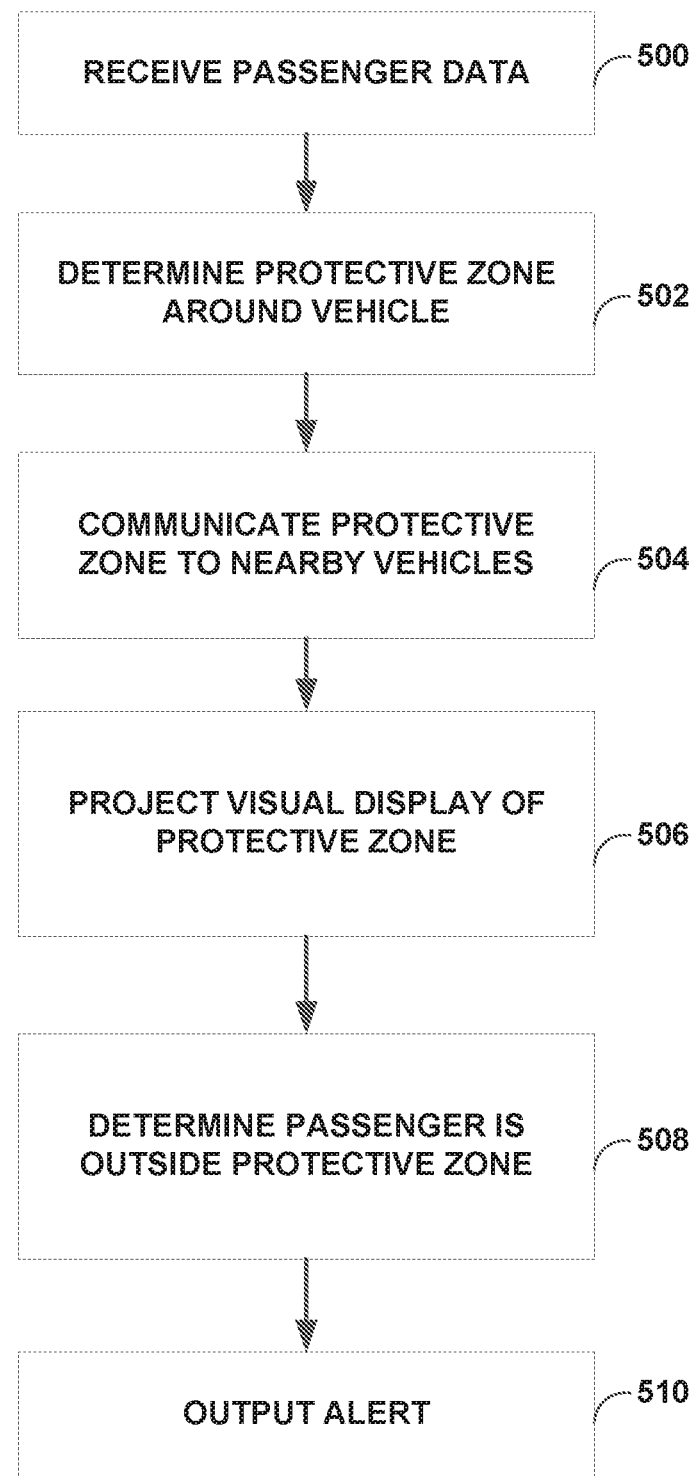
FIG. 5 is a flow diagram depicting a method of protecting passengers entering and/or exiting a vehicle, in accordance with some examples of this disclosure.

FIG. 5 is a flow diagram depicting a method of protecting passengers entering and/or exiting a vehicle, in accordance with some examples of this disclosure. A transportation safety system, including one or more computing devices (such as receivers, processors, and/or digital memory), that may be installed within an individual vehicle and/or within a fixed, centralized location, receive data from one or more sources indicating one or more personal attributes of the passengers or intended passengers of the vehicle (500). This data may indicate, for example, the number of passengers, the ages of the passengers, any medical conditions of the passengers that may affect the passengers' ability to enter or exit the vehicle, or a size and/or weight of personal belongings of the passengers that may need to be loaded into or unloaded from the vehicle.

Based at least in part on the received passenger data, the computing device or processor may determine at least a size and a shape of a personal protective zone surrounding the vehicle, of sufficient dimensions to allow the passengers to enter and/or exit the vehicle while remaining within the protective zone (502). In the event that no passenger data can be received or determined, the computing device or processor may resort to a default size and shape for the protective zone, for example, a shape completely surrounding the exterior of the vehicle, and a width at least as wide as an open door of the vehicle.

Once the processor has determined an adequate personal protective zone for the number and position of passengers or intended passengers, the processor may communicate the boundary of the zone, such as via a wireless transmitter, so that the dimensions may be received by other moving vehicles in the vicinity that are configured to receive such data (504). Similar safety system installed within such vehicles may then use the data to guide the navigate the moving vehicles safely around the border of the personal protective zone, such that the moving vehicles have a significantly reduced risk of colliding with a passenger immediately outside the stopped vehicle, such as while suddenly opening a door of the stopped vehicle.

The processor may also output an indication of the boundary of the personal protective zone to one or more light projectors, such as pico-projectors installed on the exterior of the stopped vehicle, causing the projectors to project a visual representation of the determined personal protective zone onto the road or street surface (506). This projection may allow the passengers of the stopped vehicle, as well as drivers of vehicles not configured to wirelessly receive the indication of the border, to become aware of the personal protective zone, and take the necessary precautions to avoid a collision.

Components within the safety system may monitor the movements of the passengers of the stopped vehicle to determine compliance with the defined personal protective zone. For example, one or more proximity sensors in communication with the computing device or processor may transmit information causing the processor to determine that one or more passengers is outside the boundary of the personal protective zone (508). For example, the processor may determine, based on the proximity sensor data, that one or more passengers is more than five feet from the vehicle, whereas the defined personal protective zone has a width of only four feet.

The processor may receive further information indicating whether the passenger's location is one of safety, for example, on a sidewalk or defined pedestrian zone, or one of danger, such as a lane of traffic. Upon determining that the passenger's location is both outside the personal protective zone and one of danger, the processor may output information causing the generation of an alert, for example, an audible alert, to indicate to the passenger that their safety is at risk (510).

The example techniques described in this disclosure may be a computing device, a method, and/or a computer program product. The computer program product may include a computer readable storage medium (or media) having computer readable program instructions thereon for causing a processor to carry out aspects of one or more examples described in this disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of one or more examples described in this disclosure.

Aspects of the disclosure are described herein with reference to flowchart illustrations and/or block diagrams of methods, apparatus (systems), and computer program products according to one or more examples. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various examples of this disclosure. In this regard, each block in the flowchart or block diagrams may represent a module, segment, or portion of instructions, which comprises one or more executable instructions for implementing the specified logical function(s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present disclosure has been presented for purposes of illustration and description and is not intended to be exhaustive or limited to the disclosure in the form disclosed. Many modifications and variations will be understood by persons of ordinary skill in the art based on the concepts disclosed herein. The particular examples described were chosen and disclosed in order to explain the techniques described in the disclosure and example practical applications, and to enable others of ordinary skill in the art to understand the disclosure for various examples with various modifications as are suited to the particular use contemplated. The various examples described herein are within the scope of the following claims.

What is claimed is:

1. A system comprising:
    a receiver configured to receive passenger data of at least one passenger of a vehicle; and
    processing circuitry configured to:
    determine, based at least in part on the passenger data, a personal protective zone extending from an exterior of the vehicle to a virtual border, the virtual border having a shape and surrounding at least a portion of the exterior of the vehicle;
    generate a first shape of the virtual border in response to the passenger data indicating one passenger present in the vehicle;
    generate a second shape of the virtual border in response to the passenger data indicating two passengers present in the vehicle, the first shape being different from the second shape; and
    output information indicating the determined personal protective zone.

2. The system of claim 1, further comprising proximity sensors configured to determine a location of the at least one passenger, wherein at least one of the proximity sensors or the processing circuitry is further configured to determine that the passenger is outside the determined personal protective zone based on determination of the location of the at least one passenger.

3. The system of claim 2, wherein the processing circuitry is further configured to output an alert based on the passenger being outside the determined personal protective zone.

4. The system of claim 1, further comprising a projector, wherein to output information indicating the determined personal protective zone, the processing circuitry is configured to output the information indicating the determined personal protective zone to the projector, and wherein the projector is configured to project a visual representation of the determined personal protective zone onto a road surface based on the information indicating the determined personal protective zone.

5. The system of claim 1, wherein the passenger data comprises data selected from the group consisting of a mobility of the at least one passenger and a weight of one or more belongings of the at least one passenger.

6. The system of claim 1, wherein the processing circuitry is configured to determine the personal protective zone by selecting duration of the personal protective zone based at least in part on the passenger data.

7. The system of claim 1, further comprising a transmitter, wherein the processing circuitry is configured to output information indicating the personal protective zone to the transmitter, and wherein the transmitter is configured to communicate dimensions of the determined personal protective zone to nearby vehicles.

8. The system of claim 1, wherein to determine the personal protective zone, the processing circuitry is configured to:
    determine an entry into a look-up table based on the passenger data; and
    determine at least one characteristic of the personal protective zone based on information stored in the determined entry of the look-up table, the characteristic selected from the group consisting of a size, shape, and duration.

9. The system of claim 1, further comprising a memory configured to store the passenger data.

10. The system of claim 9, further comprising:
    at least one camera, wherein:
    the receiver is configured to receive video data from the camera;
    the processing circuitry is further configured to recognize a face of the passenger from the video data; and
    the processing circuitry is configured to retrieve the passenger data from the memory based on the face.

11. The system of claim 9, further comprising:
    at least one microphone, wherein:
    the receiver is configured to receive audio data from the microphone;
    the processing circuitry is further configured to recognize a voice of the passenger from the video data; and
    the processing circuitry is configured to retrieve the passenger data from the memory based on the voice.

12. A method comprising:
    receiving passenger data of at least one passenger of a vehicle, the passenger data comprising a number of passengers in the vehicle;
    determining, based at least in part on the passenger data, a personal protective zone extending from an exterior of the vehicle to a virtual border, the virtual border having a shape and surrounding at least a portion of the exterior of the vehicle;

generating the shape of the virtual border based at least in part on the number of passengers in the vehicle; and outputting information indicating the determined personal protective zone.

13. The method of claim 12, wherein outputting information indicating the determined personal protective zone comprises outputting information indicating the determined personal protective zone to a projector, the method further comprising projecting, with the projector, a visual representation of the determined personal protective zone onto a road surface based on the information indicating the determined personal protective zone.

14. The method of claim 12, wherein the passenger data further comprises data selected from the group consisting of a mobility of the at least one passenger and a weight of one or more belongings of the at least one passenger.

15. The method of claim 12, wherein determining the personal protective zone based at least in part on the passenger data comprises selecting a duration of the personal protective zone based at least in part on the passenger data.

16. The method of claim 12, wherein outputting information indicating the determined personal protective zone comprises outputting information indicative of the determined personal protective zone to a transmitter, the method further comprising communicating, by the transmitter, dimensions of the personal protective zone to nearby vehicles.

17. A computer program product comprising a computer readable storage medium having program instructions embodied therewith, the program instructions executable by a processor to cause the processor to perform a method, the method comprising:

receiving passenger data of at least one passenger of a vehicle, the passenger data comprising a number of passengers in the vehicle;

determining, based at least in part on the passenger data, a personal protective zone extending from an exterior of the vehicle to a virtual border, the virtual border having a shape and surrounding at least a portion of the exterior of the vehicle;

generating the shape of the virtual border based at least in part on the number of passengers in the vehicle; and outputting information indicating the determined personal protective zone.

18. The computer program product of claim 17, wherein the passenger data further comprises data selected from the group consisting of a mobility of the at least one passenger and a weight of one or more belongings of the at least one passenger.

19. The computer program product of claim 18, wherein the determining the personal protective zone comprises selecting a duration of the personal protective zone based at least in part on the passenger data.

20. The computer program product of claim 17, wherein the outputting information indicating the determined personal protective zone comprises outputting information indicative of the determined personal protective zone to a transmitter; and wherein the method further comprises communicating, by the transmitter, dimensions of the personal protective zone to nearby vehicles.

\* \* \* \* \*